United States Patent
Heil et al.

(10) Patent No.: US 6,287,529 B1
(45) Date of Patent: Sep. 11, 2001

(54) METHOD FOR SELECTIVE CATALYTIC OXIDATION OF CARBON MONOXIDE

(75) Inventors: Dietmar Heil, Deggenhausertal; Barbara Strobel, Dornstadt; Norbert Wiesheu, Günzburg; Detlef zur Megede, Bubesheim; Uwe Benz, Uhldingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/192,576

(22) Filed: Nov. 17, 1998

Related U.S. Application Data

(62) Division of application No. 08/753,809, filed on Dec. 2, 1996, now Pat. No. 5,874,051.

(30) Foreign Application Priority Data

Dec. 1, 1995 (DE) ................................. 195 44 895

(51) Int. Cl.[7] .................................. C01B 31/20
(52) U.S. Cl. .................. 423/247; 423/437.2; 423/658.3
(58) Field of Search .................. 422/171, 177, 422/172, 173, 198, 202, 211, 194; 423/247, 658.3

(56) References Cited

U.S. PATENT DOCUMENTS

| | | | | |
|---|---|---|---|---|
| 1,366,176 | * | 1/1921 | Harger et al. ............... | 423/658.3 |
| 1,375,737 | * | 4/1921 | Rideal et al. ............... | 423/658.3 |
| 1,375,932 | * | 4/1921 | Rideal et al. ............... | 423/658.3 |
| 2,103,219 | * | 12/1937 | Jewness ...................... | 423/247 |
| 3,798,005 | * | 3/1974 | Koch et al. .................. | 422/194 |
| 4,393,031 | * | 7/1983 | Henke et al. ................ | 422/172 |
| 5,271,916 | * | 12/1993 | Vandenborgh et al. ..... | 423/247 |
| 5,316,747 | * | 5/1994 | Pow et al. .................. | 423/247 |
| 5,330,727 | * | 7/1994 | Trocciola et al. ........... | 422/175 |
| 5,951,953 | * | 9/1999 | Zardi et al. ................. | 422/197 |

FOREIGN PATENT DOCUMENTS

| | | | |
|---|---|---|---|
| 2930214 | * | 3/1980 | (DE). |
| 4334981 | * | 4/1995 | (DE). |
| 4334983 | * | 4/1995 | (DE). |
| WO91/16970 | * | 11/1991 | (WO). |
| 91/16970 | | 11/1991 | (WO). |
| 93/19005 | | 9/1993 | (WO). |
| WO/93/19005 | * | 9/1993 | (WO). |

OTHER PUBLICATIONS

"Static Mixing of Gases", W.A. Tasucher & E.A. Streiff Chemical Engineering Progress 1979.*
"Static Mixing of Gases", W.A. Tasucher and F.A. Streiff, CEP, Apr. 1979.

* cited by examiner

*Primary Examiner*—Steven P. Griffin
*Assistant Examiner*—Maribel Medina
(74) *Attorney, Agent, or Firm*—Crowell & Moring, L.L.P.

(57) ABSTRACT

In a method and apparatus for selective catalytic oxidation of carbon monoxide, the gas mixture and an additionally added oxidizing gas are conducted through a reactor containing the catalyst. Oxidizing gas is added at several points along the mixed gas flow path with a controlled or regulated through flow volume. The mixed gas stream is cooled passively by static mixing structures located in the inlet area of the CO-oxidation reactor. By controlling exothermal CO oxidation along the reactor path, a very variable process guidance is provided, that can be adjusted to individual situations.

5 Claims, 2 Drawing Sheets

METHOD FOR SELECTIVE CATALYTIC OXIDATION OF CARBON MONOXIDE

This application is a division of application Ser. No. 08/753,809, filed Dec. 2, 1996 now U.S. Pat. No. 5,874,051.

BACKGROUND AND SUMMARY OF THE INVENTION

The invention relates to a method and apparatus for selective catalytic oxidation of carbon monoxide in a mixed gas stream containing hydrogen, in which an oxidizing gas is added to the mixed gas stream and the latter is conducted through a reactor containing the catalyst.

Methods for selective catalytic oxidation of carbon monoxide in a mixed gas stream which also contains hydrogen are used for example in conjunction with catalytic ammonia production, as disclosed in German patent document DE-OS 29 30 214, or in the preparation of hydrogen as a fuel for a fuel cell, as disclosed in International patent document WO 93/19005. Numerous methods and devices with suitable catalysts for such selective oxidation of carbon monoxide are already known, including in addition to the above documents, German patent document DT 15 67 492 and Japanese patent document JP 3-208801 (A). In the latter publication, oxidation takes place in two parallel reactors to which the mixed gas stream and the oxidizing gas are added alternately and intermittently, with one reactor adsorbing carbon monoxide while the previously adsorbed carbon monoxide is oxidized in the other. In the method disclosed in the above-mentioned German patent document DE-OS 29 30 214 A1, the oxidizing gas, (air in that case) is mixed with the mixed gas stream containing hydrogen and carbon monoxide, upstream of the carbon monoxide oxidation reactor, and is conducted together with the latter into the reactor.

The above-mentioned International patent document WO 93/129005 discloses a single- or multistage reactor for selective catalytic carbon monoxide oxidation in which each stage in turn can consist of one or more parallel reactor units. A mixed gas stream containing primarily hydrogen as well as small quantities of carbon monoxide (for example, from a hot steam reformation of a hydrocarbon, such as methanol) is supplied on the input side. As an alternative to admixture of air or oxygen to the mixed gas stream upstream of the carbon monoxide oxidation reactor, provision is made for conducting the oxidizing gas directly into the reaction chamber. The gas stream from the carbon monoxide oxidation reactor, which is purified of carbon monoxide and consists entirely of hydrogen, is conducted as a fuel to a fuel cell. Removal of the carbon monoxide prevents harmful poisoning of the fuel cell. To perform selective catalytic carbon monoxide oxidation, a two-stage process is provided, with a higher reaction chamber temperature of approximately 160° C. in the first stage and a lower reaction chamber temperature of less than 105° C. in the second stage. To adjust these temperatures, the catalyst bed reaction chambers are traversed by cooling coils of the respective cooling circuits with controllable coolant throughput volumes.

German patent document DE-OS 43 34 983 A1 describes a method for removing carbon monoxide for a hydrogen-rich gas in at least two stages, including CO-oxidation stages and/or methanization stages. CO oxidation is accomplished by supplying air to a selective oxidation catalyst containing a noble metal, for example, $Pt/Al_2O_3$-, $Ru/Al_3O_3$- or Pt zeolite material.

German patent document DE-OS 4334 981 A1 utilizes a reactor for catalytic removal of carbon monoxide from a hydrogen-rich gas with a selective CO-oxidation catalyst containing a noble metal. The catalyst has a structure which is coated with a catalyst, and produces a turbulent flow, favoring heat transport.

The object of the present invention is to provide a method and apparatus of the type described above, in which the oxidation reaction can be suitably controlled by the reaction path of the mixed gas stream, and in which pre-cooling of a mixed gas stream coming from a hot steam reformation is not required.

This object is achieved according to the invention, by conducting a controlled or regulated throughput volume of the oxidizing gas into the CO-oxidation reactor, so that heat generation in the exothermal CO-oxidation reaction can be influenced. In combination with a regulation of the coolant volume flow, therefore, the temperature level of the CO-oxidation stage can be adjusted. By passive cooling of the mixed gas stream with the aid of static mixing structures, the temperature of the mixed gas stream can be set to a desired temperature level even before it reaches the active reaction volume. This arrangement offers, among other things, the advantage that when the reformate from a methanol hot-steam reformation is used as the input gas mixture, intermediate cooling of the reformat prior to introduction into the CO-oxidation reactor, as is frequently provided in conventional installations, is not absolutely necessary. Instead, the reformate can be conducted directly into the CO-oxidation reactor. Therefore, reformate cooler can either be eliminated altogether, or in any event made much smaller than usual. There is also no need for an additional complex heating circuit to produce the required reactor temperature.

The method according to the invention permits an extremely flexible process, and hence a comparatively high space velocity for the mixed gas stream. The resultant flexible controllability of process guidance makes the method especially suitable for mobile applications, for example in motor vehicles powered by fuel cells.

A feature of the invention is that it can be used advantageously in systems in which hydrogen for fueling a fuel cell is obtained by methanol reformation. When this method is used, intermediate reformate cooling is eliminated. Moreover, because the heat-carrying medium for cooling the CO-oxidation reactor is kept at the fuel cell temperature, the temperature gradient between the hot-steam reformation process and the fuel cell is utilized in the intermediate CO-oxidation stage and thus can be controlled to achieve a high degree of CO oxidation.

The provision of a static mixing structure in the input area of the CO-oxidation stage promotes uniform distribution and mixing of the mixed gas stream. Particularly when the oxidizing gas is added upstream of the CO-oxidation stage, the static mixing structures causes a mixing of the oxidizing gas with the mixed gas stream containing the hydrogen. In addition, the contact between the mixed gas stream and the outside wall of the CO-oxidation reactor is increased and thus passive cooling of the mixed gas stream is achieved before it reaches the active reaction volume.

According to another embodiment of the invention, a compact, modular-design plate reactor is provided for selective catalytic CO oxidation, whose geometry can be adapted easily to the other system components and is especially suitable for mobile applications in motor vehicles powered by fuel cells. The modular plate reactor design makes it possible, in conjunction with the possibility of adding the oxidizing gas in adjustable amounts along the reaction path, to have a high space velocity for the mixed gas stream, which in turn makes it possible to design the reactor as a whole with comparatively small volume and weight.

Other objects, advantages and novel features of the present invention will become apparent from the following detailed description of the invention when considered in conjunction with the accompanying drawings.

DETAILED DESCRIPTION OF THE DRAWINGS

Figure 1:
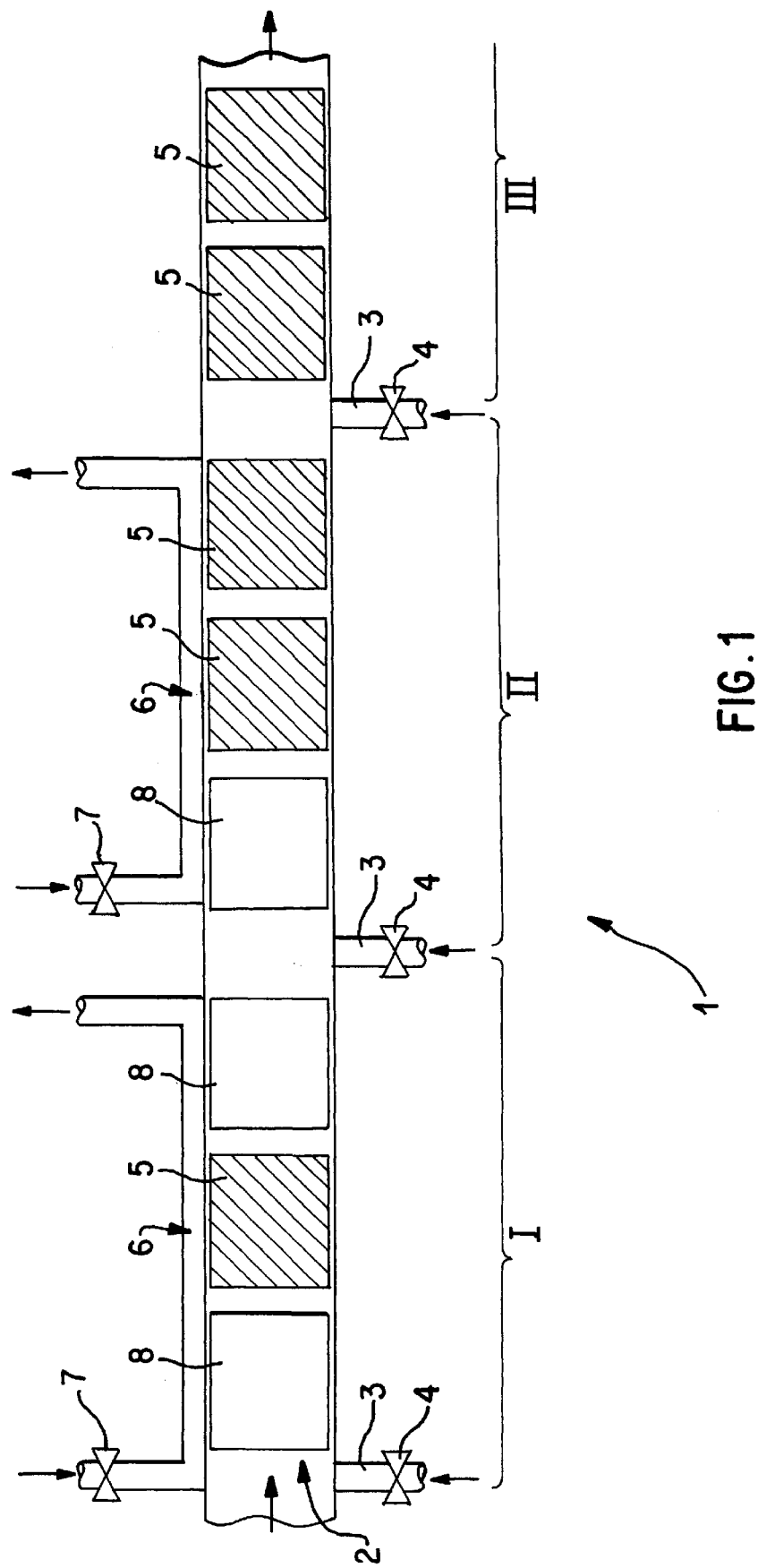
FIG. 1 shows a schematic diagram of a multistage CO-oxidation reactor according to the invention.

Referring to FIG. 1, the CO-oxidation reactor 1 consists of three oxidation stages marked I, II, and III, which can be provided in a common reaction chamber 2 (as shown) or can be made as separate components with external connecting lines. The mixed gas stream containing hydrogen is supplied to CO-oxidation reactor 1 in the vicinity of the first oxidation stage I. The percentage of carbon monoxide in the mixed gas stream is reduced in each of the individual reaction stages I–III, to a final value in the vicinity of less than 40 ppm. The mixed gas stream then leaves CO-oxidation reactor 1 in the vicinity of oxidation state III.

In the individual oxidation stages I–III, the carbon monoxide is reduced in stages by selective oxidation on suitable catalysts. For this reaction, an oxidizing gas (preferably oxygen or air) is added to the mixed gas stream through inlet openings 3 at a number of points before and/or in CO-oxidation reactor 1. Metering devices 4 are provided at each of the inlet openings 3 to regulate or control the addition of oxidizing gas. In FIG. 1 these metering devices 4 are shown in the form of valves; however, any other metering devices could be used.

As the catalyst for selective CO oxidation, among other substances, platinum and/or ruthenium or a zeolite or aluminum oxide carrier are suitable. This catalyst can be added to reaction chamber 2 in any form. In addition to using bulk material or pellets, it is advantageous to apply the catalyst to metal catalyst support units 5, which can also be used to guide the flow, thus making it possible to improve the material exchange in reaction chamber 2 as well as the heat exchange of the mixed gas stream with the walls of reaction chamber 2. For each oxidation stage I–III, one or more of these catalyst support units 5 can be provided.

Cooling chambers 6, which are traversed by coolant, are provided to cool CO-oxidation reactor 1. According to FIG. 1, oxidation stages I and II have separate cooling chambers, to which the coolant is metered through a valve 7. Alternatively, cooling chambers 6 can be integrated advantageously into a common cooling circuit, with the two cooling chambers 6 being traversed in series or parallel. If CO-oxidation reactor 1 is used in a fuel-cell system, cooling chambers 6 are preferably integrated into the coolant circuit of the fuel cell. It is also possible to provide a continuous cooling chamber 6 for the entire CO-oxidation reactor 1. The exact design and arrangement of the cooling chambers 6 depends on the type of reactor used. For example if CO-oxidation reactor 1 is designed as a plate reactor, plates with integrated cooling and/or reaction chambers are stacked alternately on one another.

Additional static mixing structures 8 provided in the inlet area of oxidation stages I and II help to mix the oxidizing gas with the rest of the mixed gas stream to enrich it and guide the flow. There is no catalyst in the vicinity of these static mixing structures 8; however, the same support units that are used for the catalyst may also be used for static mixing structures 8, with only the catalyst coating omitted. Alternatively, porous plates or other devices that have the required properties may be used. The use of these static mixing structures 8 also has an additional critical advantage in that as a result of the improved contact of the mixed gas stream with the outside walls of reaction chamber 2, they produce a passive cooling of the incoming mixed gas stream. Thus, pre-cooling of the mixed gas stream with separate heat exchangers can be eliminated.

An additional mixing structure 8 can be provided in the outlet area of oxidation stage I, to prevent high local concentrations of the oxidizing gas. Depending on the prevailing temperature level in the respective oxidation stage I–III, damage to the catalyst may result from direct contact with the added oxidizing gas. However, a mixing structure is unnecessary in the outlet area of oxidation state II, since in this case both the CO concentration and the temperature level have already been reduced. In oxidation stage III, there are neither mixing structures 8 nor a cooling chamber 6. In this latter stage, carbon monoxide produced in the partial load area by secondary reactions is oxidized during adiabatic operation with simultaneous reduction of the cross-sectional area.

By using the method according to the invention, the course of the reaction can be controlled throughout the entire CO-oxidation reactor 1, even during dynamic operating modes. The static mixing structures 8 permit simple adjustment of the inlet temperature of the mixed gas stream, so that the latter can be cooled to the desired temperature before it reaches the catalyst. By adjusting the coolant volume flow, the quantity of heat carried away per unit time can be adjusted as well. As a result of the controlled addition of oxidizing gas at several points along the reaction path, the oxidation reaction itself can be influenced, since the energy released in the exothermal oxidation reaction depends on the quantity of oxidizing gas that is available. By combining these measures, a predetermined reaction pattern can be set over the entire reaction volume. In addition, operating parameters can be taken into account, which is an important advantage in dynamic operating modes of CO-oxidation reactor 1. For this purpose, the metering devices 4, 7 of the individual stages are preferably controlled by a central control device. In this manner, for example, the volume of coolant flow can be decreased for a predetermined time period when the system is started.

Figure 2:
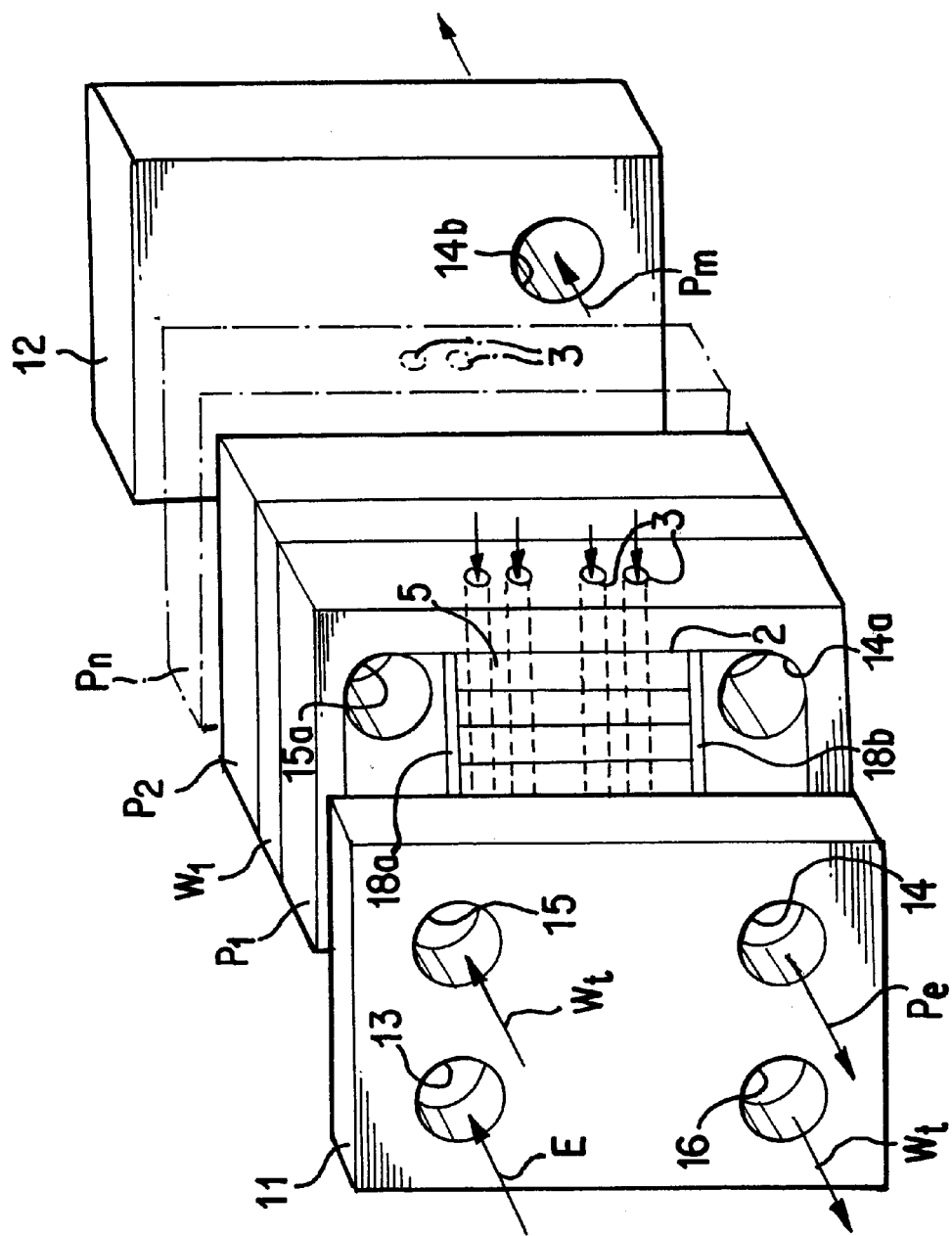
FIG. 2 shows an exploded schematic perspective view of a compact modular-design plate reactor for selective catalytic CO oxidation.

A preferred embodiment of a CO-oxidation reactor 1 according to the invention is shown in FIG. 2. This compact plate reactor can be built by connecting in series any number n (n≥1) of individual plate reactor modules ($P_1$ to $P_n$). The individual modules $P_1$ to $P_n$) are arranged in a row with spaces between them, their flat sides facing one another, with a heat-absorbing area ($W_1$ to $W_{n-1}$) between each two modules. At the front and rear, the row of plate reactor modules is closed off by a front plate (11) and a back plate (12). In front plate (11), a hole (13) is provided in an upper area as an inlet for an educt gas stream (E) which flows directly from the reformate of a methanol hot-steam reformation, without intermediate cooling. (Of course other mixed gas streams containing hydrogen and carbon monoxide can be conducted into the reactor for selective catalytic carbon monoxide (CO) oxidation).

In the lower area, front plate (11) has a product gas outlet (14) from which the product gas stream ($P_e$), free of CO after CO oxidation consisting essentially of hydrogen alone, escapes when the reactor is designed for removal of product gas at the front end. If the reactor is designed for product gas removal at the rear end, back plate (12), as shown, is provided with a corresponding outlet (14b) in its lower area. For example, with a single-stage reactor design, front product gas removal can be provided, and in a multistage reactor design, rear product gas removal can be provided. Front plate (11) also has an inlet (15) in its upper area, through which a flow (Wt) of a heat-carrying medium is introduced into the reactor at the front and removed again at the front as well, through the outlet (16) in its lower area.

The individual reactor plate modules $P_1$ to $P_n$ are provided with inlet, outlet, or through openings that match the abovementioned inlet and outlet openings in front plate (11) and back plate (12) such that in each case the desired flow relationships are achieved in the reactor. That is, the heat-carrying medium (Wt) passes through openings (15a) in each reactor module ($P_1$ to $P_n$), and into chambers or areas ($W_1$ to $W_{n-1}$) which absorb the heat and are located behind. There, the heat-carrying medium flows along the boundary walls of the adjacent reactor module or modules and absorbs the heat generated in them. The heated heat-carrying medium then escapes from outlet openings in reactor modules ($P_1$ to $P_n$) toward the front again. The through outlet openings are located diametrically opposite the inlet through openings (of which those (15a) of a first reactor module $P_1$) can be seen in FIG. 2) in order to produce a complete through flow through the heat-absorbing chambers ($W_1$ to $W_{n-1}$).

With a multistage design (i.e. n>1), each of the n reactor modules ($P_1$ to $P_n$) has in the two other corner areas that are not occupied by through openings for the heat-carrying medium, two openings likewise located diametrally opposite one another, one of which is the inlet opening and the other is the outlet opening for the reaction gas mixture. On each module, the inlet opening is open only on the front and the outlet opening is open only on the back, and adjacent modules are arranged so that the outlet opening of one stage is connected to the inlet opening of the subsequent stage. The outlet opening of the last stage ($P_n$) terminates in the outlet (14b) for the product gas stream ($P_m$) in back plate (12). In multistage processes, the gas stream containing hydrogen and carbon monoxide is thus conducted as a reformate through front plate (11) into the upper area of first reactor module ($P_1$), passes through a reaction chamber (2) (described in greater detail below) to the lower area of the first reactor module. Thereafter, it flows into the connecting second reactor module ($P_2$), from bottom to top through its reaction chamber, and enters the upper area of the next reactor module, etc. until it emerges as a product gas stream ($P_m$) at back plate (12).

In this multistage process, with a product gas outlet at the back, product gas outlet (14) in front plate (11) is closed. Accordingly, with front product gas removal, this outlet (14) is opened, with assurance being provided that product gas stream ($P_e$) does not escape at back plate (12). The reactor module used ($P_1$) is modified for purposes of a single-stage process, for example, with a front product-gas outlet; in contrast to the design described above, it has an outlet opening (14a) that is open to the front, as shown in FIG. 1. This opening (14a) in first module ($P_1$) can also be made as a through opening, so that this module can be used in a single-stage as well as a multistage reactor design, for which purpose the appropriate product gas outlet (14, 14b) in front plate (11) or back plate (12) need only be closed. Moreover, the flow direction of the heat-carrying medium shown, from top to bottom in each module ($P_1$ to $P_n$), the opposite flow direction can be provided as an alternative. If necessary, instead of the single module shown, each reactor stage can have a plurality of modules arranged parallel to one another, with the fluids being distributed by the reactor end plates (11, 12), to suitable distributing and collecting ducts with which the reaction chambers (2) and the heat=absorbing chambers ($W_1$ to $W_{n-1}$) are appropriately connected. The heat-absorbing chambers ($W_1$ to $W_{n-1}$) between module reactor chambers (4) are provided by hollow chamber cells that are separate from the modules or hollow chamber cells mounted on the back or front of the respective reactor modules. The module units can be connected together releasably or non-releasably by conventional welded connections, with suitable seals being provided to ensure sealed fluid flow conditions for the reaction gas stream and the heat-carrying medium.

Between the respective inlet and outlet areas for the reaction gas mixture, each reactor module ($P_1$ to $P_n$) has a reaction chamber (2). Catalyst carrier units (5) located in the reaction chamber include a carrier zeolite or $Al_2O_3$ in powder form applied to a metallic support. A suitable catalyst, for example platinum and/or ruthenium, is applied to this carrier structure. A plurality of such catalyst support units (5) is preferably located in reaction chamber (2) of each module ($P_1$ to $P_n$), with a plurality of units in an array of rows and columns which are parallel with the flow of reaction gas, and transverse to it respectively. Alternatively, however, a single unit (5) can be provided that is parallel and a plurality (four for example) that are in series. At the bottom and top, the reaction chamber (2) containing catalyst support units (5) is covered by a porous sintered metal plate or a porous fleece material by which the mixed gas stream is distributed homogeneously over catalyst support units (5). Together with catalyst support units (5), these porous cover layers (18a, 18b) also enable the individual module components to support one another, which can contribute to achieving a homogenous seal between the various media.

As can be seen from FIG. 1, one important property of the plate reactor is that each reactor module ($P_1$ to $P_n$) is provided with inlet openings (3) that lead into the reaction chamber (2) at different levels with respect to the flow direction of the mixed gas stream. The oxidant required for CO oxidation, for example air or oxygen, is introduced through these openings, upstream of and/or between the individual catalyst support units (5). In the example shown, the oxidizing gas is added in a forward reactor module. As an alternative to the costly regulation of oxidant addition at the individual inlet openings, local metering can also be performed at low cost by using passive flow distributing elements such as diaphragms for example. Since the quantity of oxidizing gas that is added determines the degree of exothermal CO oxidation that takes place, the temperature in the reactor can simultaneously be adjusted in conjunction with the other relevant parameters, to achieve practically any desired temperature profile along the flow path of the reaction gas mixture. Thus, the educt (E) from a methanol hot-steam reformation can be introduced into the CO-oxidation reactor directly without the usual reformate intermediate cooling, for example at a temperature of about 250° C., which makes a corresponding reformate cooler unnecessary or in any event allows it to be made smaller.

When using the plate reactor upstream of a fuel cell system, in order to introduce a product gas stream that consists primarily of pure hydrogen directly as a fuel into the fuel cell system, the heat-carrying medium (Wt) that is fed through the reactor is kept at the fuel cell temperature (for example about 80° C.), so that the reaction gas mixture flowing through the reactor can cool from the reformate temperature at the reactor inlet, to the fuel cell temperature at the reactor outlet. The temperature gradient thus produced in the reactor can be utilized advantageously for selective catalytic CO oxidation, so that, in addition to the addition of oxidant, other factors (such as a catalyst coating along the flow path of the reaction gas mixture through the reactor) can be adjusted in appropriate fashion.

As can be seen from the foregoing, with the reactor according to the invention, selective catalytic oxidation of carbon monoxide contained in the educt stream (E) of a methanol hot-steam reformation can be performed in a very flexible manner, and at relatively low cost. In particular, the hot reformate gas stream (Pe, Pm) is conducted directly into the reactor and the emerging product gas stream is fed directly to a fuel cell as a fuel. By deliberate local adjustment of the amount of oxidizing gas that is added as a function of the reaction distance, a desired temperature profile can be set in the reactor so that the most favorable reaction conditions for maximum possible CO removal can be set for each application.

The reactor can be operated with a comparatively high space velocity and has a stable reaction process. By virtue of its modular design, the size of the reactor can be optimized at low cost, both as to the number of successive reactor stages and as to the size of each individual stage for the given application, or can be modified very easily by adding or removing individual modules. By guiding the reaction gas mixture in the plate plane or successive module plates, the compact plate reactor with a given reaction path length can have very small dimensions. Of course, neither the reactors according to the invention, nor the methods according to the invention that can be practiced with them, are limited to CO removal from the reformat of a methanol hot-steam reformation. They are also suitable for other applications in which carbon monoxide must be removed by selective catalytic oxidation from a gas mixture rich in hydrogen.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of controlling a process for selective catalytic oxidation of carbon monoxide in a mixed gas containing hydrogen, in which a stream of the mixed gas is passed through a carbon-monoxide reactor containing a catalyst and a cooling device that is traversed by a flow of coolant, said method comprising:

adding an oxidizing gas to the mixed gas at points along the mixed gas stream;

passively reducing temperature of the mixed gas stream within the carbon-monoxide reactor, by providing static mixing structures in the reactor, which mixing structures are arranged to increase circulation of said mixed gas stream into contact with outside walls of said reactor; and providing a desired temperature profile along the mixed gas stream within the carbon monoxide reactor, by
selectively adjusting a flow volume of the oxidizing gas at at least one of said points along the mixed gas stream; and
adjusting a volume of coolant which flows through portions of the cooling device.

2. Method according to claim 1, wherein a relative volume of oxidizing gas which is added to the mixed gas stream containing hydrogen, is varied as a function of system operating parameters.

3. The method according to claim 1, wherein the coolant volume flow is reduced for a predetermined period of time when the system is started.

4. The method according to claim 1, wherein:

a multistage CO-oxidation reactor is used, with oxidizing gas being added to the mixed gas stream at least upstream of each oxidation stage; and the respective oxidation stages are kept at preset operating temperatures by regulating coolant volume flow and volume of oxidizing gas added.

5. The method according to claim 1, wherein:

the mixed gas containing hydrogen and carbon monoxide is reformate of a hydrocarbon reformation, and is added to CO-oxidation reactor without intermediate cooling;

gas emerging from CO-oxidation reactor is fed to a fuel cell; and the fuel cell cooling circuit is used to cool CO-oxidation reactor.

* * * * *